US011182112B1

(12) United States Patent
Chang et al.

(10) Patent No.: US 11,182,112 B1
(45) Date of Patent: Nov. 23, 2021

(54) METHODS AND SYSTEMS FOR CREATING ICC PRINTER PROFILES WITH UNORTHODOX INK LIMITS

(71) Applicant: Kyocera Document Solutions Inc., Osaka (JP)

(72) Inventors: Michael M. Chang, El Segundo, CA (US); Javier A. Morales, El Segundo, CA (US)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 16/914,943

(22) Filed: Jun. 29, 2020

(51) Int. Cl.
*G06F 3/12* (2006.01)
*H04N 1/60* (2006.01)

(52) U.S. Cl.
CPC .......... *G06F 3/1205* (2013.01); *G06F 3/1227* (2013.01); *H04N 1/60* (2013.01)

(58) Field of Classification Search
CPC combination set(s) only.
See application file for complete search history.

(56) References Cited

U.S. PATENT DOCUMENTS

| 7,050,196 | B1 | 5/2006 | Piatt | |
| 2009/0237757 | A1* | 9/2009 | Sawada | H04N 1/6097 358/518 |
| 2012/0218574 | A1* | 8/2012 | Fukuda | H04N 1/6097 358/1.9 |
| 2016/0212301 | A1* | 7/2016 | Tamagawa | G06K 15/1878 |
| 2018/0041663 | A1* | 2/2018 | Yamamoto | B41J 29/38 |

* cited by examiner

*Primary Examiner* — Helen Zong
(74) *Attorney, Agent, or Firm* — GrowIP Law Group LLC

(57) ABSTRACT

Example embodiments relate to creating ICC printer profiles with unorthodox ink limits. A printing device may initially print a color profile chart represented by color combinations that are equal to or below an ink limit and generate a first ICC profile based on the color profile chart. The first ICC profile uses a first color set to map input colors of a source color space to output colors of a destination color space. At least one color of the first color set, however, may be represented by a color combination that exceeds the ink limit and thus the printing device may determine a second color set based on the first color set. For the second color set, each color is represented by a color combination that is equal to or below the ink limit. A second ICC profile may be generated to use the second color set.

18 Claims, 5 Drawing Sheets

METHODS AND SYSTEMS FOR CREATING ICC PRINTER PROFILES WITH UNORTHODOX INK LIMITS

BACKGROUND

Color transformation, also referred to herein as color space conversion or color conversion, involves transforming the representation of a color from one color space to another color space. In some implementations, a device-independent intermediary space is used for the conversion between a source color space and a destination color space. To help simplify color transformation, the International Color Consortium (ICC) developed a set of standards that are used to create ICC profiles that characterize different color spaces. Under the terminology set by the ICC, color conversion typically involves using a source ICC profile to convert the source color space into a profile connection space (PCS) and using a destination ICC profile to derive the destination color space based on input colors from the PCS. The PCS can use either the CIELAB (L*a*b* color space) or the CIEXYZ color space for color conversions.

Some color transforms are governed by well-defined mathematical equations, such as from a red, green, and blue (RGB) color space to a device-independent color space (e.g., the XYZ color space). Other color transforms may lack these mathematical equations and instead utilize one or more look up tables (LUTs). A LUT conveys local empirical correspondences that can be used to map one color space to another. For example, to convert from the L*a*b* color space to the CMYK color space, a three-dimensional look up table (3D-LUT) can be used. In the L*a*b* color space, colors are expressed using three components: an L* component, an a* component, and a b* component. Each of these components is represented by an 8-bit integer, and there are 256 possible values of each component. A complete 3D-LUT for the color conversion would therefore include 256-by-256-by-256 inputs, and a corresponding 4-byte CMYK output for each input. As such, an ICC profile may include one or more well-defined mathematical equations and/or one or more LUTs for use during color conversion between color spaces.

For color printing, an ICC printer profile can be used as the destination ICC profile within a typical ICC color conversion workflow and enable color conversion from input colors associated with a printer job to CMYK ink combinations that the printer can use to complete the job. Particularly, the ICC printer profile is used to convert from PCS device-independent colors (e.g., CIE L*a*b*) to CMYK quantities that the printer can replicate within the printing process. Thus, during the creation of an ICC printer profile, standard profile maker software tools are configured to identify CMYK ink combinations that are the best matches for the input PCS colors. The CMYK ink combinations identified by the software are then used within one or more 3D-LUTs stored by the ICC printer profile to enable mapping input L*a* b* quantities from the PCS to output CMYK ink combinations.

When generating an ICC printer profile, standard ICC profile maker software typically enforces an ink limit. The ink limit is used due to the physical and chemical interactions that can arise from printing ink onto paper, which can negatively impact a print job when too much ink is used overall. As a result, standard profile maker software tools typically only match each input PCS color using a CMYK ink combination that is equal to or below the ink limit, which is typically represented as a total percentage. For example, assuming that there is a 100 percent maximum for each ink, the "no limit" scenario would result a 400% CMYK ink limit. In some scenarios, a lower ink limit is applied (e.g., 300%).

In addition to enforcing the ink limit, the conventional ICC profile maker software follows some assumptions when finding the best CMYK-to-PCS color matches under the ink limit for an ICC printer profile. For instance, the software assumes that the different inks (cyan, magenta, yellow, and black) each contribute to the total ink limit on the same scale. Under this assumption, a first CMYK combination with 100% cyan, 100% magenta, 50% yellow, and 25% black would be considered as having the same amount of ink as a second CMYK combination with 75% cyan, 75% magenta, 25% yellow, and 100% black. Thus, despite percentage variations across the different inks, the software adheres to a generalization that considers both CMYK combinations as having a total amount of ink at 275%. And because printer manufactures typically also adhere to this assumption, profile maker software tools are designed to enforce this assumption when finding CMYK color matches that are under ink limits when generating new ICC printer profiles. As inkjet printing expands for more applications, however, the nature of the inks used for many applications have unorthodox ink limits that violate this primary assumption followed by existing ICC profile maker software as described herein. Therefore, there exists a desire for the ability to create ICC printer profiles that can accommodate printing applications that have unorthodox ink limits.

SUMMARY

In one example, a system is described. The system includes a processor and a non-transitory computer-readable medium having stored therein instructions that are executable to cause the system to perform various functions. The functions include printing, via a printing device, a color profile chart having a plurality of color segments. Each color segment is represented by a color combination that is equal to or below an ink limit. The functions also include, based on the plurality of color segments of the color profile chart, generating a first ICC profile. The first ICC profile uses a first color set to map input colors of a source color space to output colors of a destination color space. At least one color of the first color set is represented by a particular color combination that exceeds the ink limit. The functions also include determining a second color set based on the first color set. Each color of the second color set is represented by a given color combination that is equal to or below the ink limit. The functions also include generating a second ICC profile that uses the second color set to map input colors of the source color space to output colors of the destination color space.

In another example, a method is described. The method involves printing, via a printing device, a color profile chart having a plurality of color segments. Each color segment is represented by a color combination that is equal to or below an ink limit. The method further involves, based on the plurality of color segments of the color profile chart, generating a first ICC profile. The first ICC profile uses a first color set to map input colors of a source color space to output colors of a destination color space, and wherein at least one color of the first color set is represented by a particular color combination that exceeds the ink limit. The method further involves determining a second color set based on the first color set, wherein each color of the second color set is represented by a given color combination that is equal to or below the ink limit. The method also involves generating a second ICC profile that uses the second color set to map input colors of the source color space to output colors of the destination color space.

In another example, a non-transitory computer-readable medium is described. The non-transitory computer-readable medium has stored therein instructions that are executable to cause a system to perform the functions of the method described above.

The features, functions, and advantages that have been discussed can be achieved independently in various embodiments or may be combined in yet other embodiments further details of which can be seen with reference to the following description and figures.

BRIEF DESCRIPTION OF THE FIGURES

The novel features believed characteristic of the illustrative embodiments are set forth in the appended claims. The illustrative embodiments, however, as well as a preferred mode of use, further objectives and descriptions thereof, will best be understood by reference to the following detailed description of an illustrative embodiment of the present disclosure when read in conjunction with the accompanying figures, wherein:

DETAILED DESCRIPTION

Figure 1:
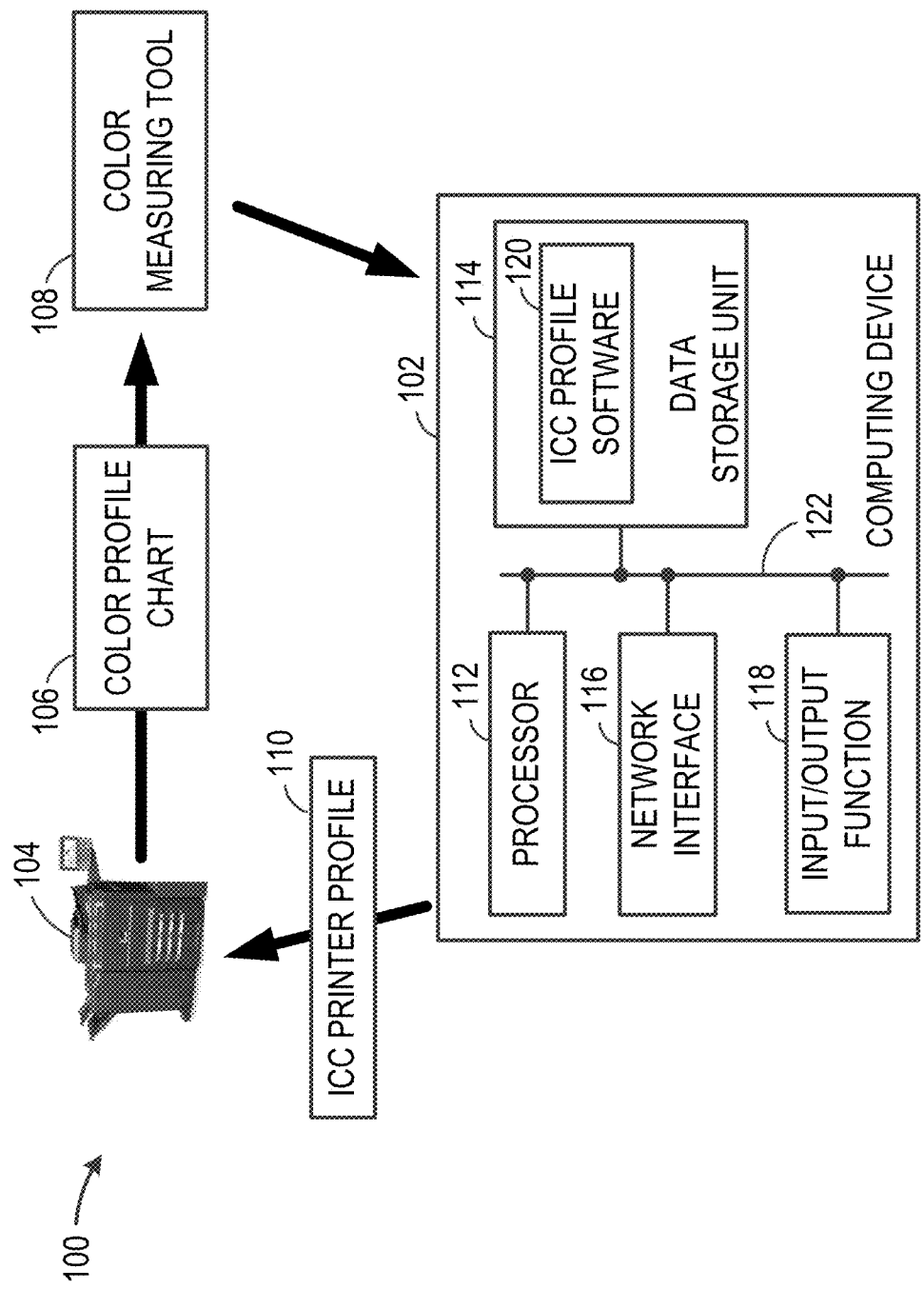
FIG. 1 conceptually illustrates a system, according to an example embodiment.

Example methods, devices, and systems are described herein. It should be understood that the words "example" and "exemplary" are used herein to mean "serving as an example, instance, or illustration." Any embodiment or feature described herein as being an "example" or "exemplary" is not necessarily to be construed as preferred or advantageous over other embodiments or features unless stated as such. Other embodiments can be utilized, and other changes can be made, without departing from the scope of the subject matter presented herein.

Thus, the example embodiments described herein are not meant to be limiting. It will be readily understood that the aspects of the present disclosure, as generally described herein, and illustrated in the figures, can be arranged, substituted, combined, separated, and designed in a wide variety of different configurations.

Further, unless context suggests otherwise, the features illustrated in each of the figures may be used in combination with one another. Thus, the figures should be generally viewed as component aspects of one or more overall embodiments, with the understanding that not all illustrated features are necessary for each embodiment.

Additionally, any enumeration of elements, blocks, or steps in this specification or the claims is for purposes of clarity. Thus, such enumeration should not be interpreted to require or imply that these elements, blocks, or steps adhere to a particular arrangement or are carried out in a particular order.

As discussed above, each 3D LUT associated with an ICC printer profile typically use ink color combinations that adhere to a total ink limit because ICC profile maker software typically only works with ink combinations under the total ink limit when attempting to identify the best color match for each input PCS value. In addition, the ICC profile maker software also assumes that the contributions by each ink to the total ink limit are equivalent. With inkjet printing expanding to include different applications, however, the nature of the different inks appears to violate the same scale assumption in some situations. For instance, the new, unorthodox ink limit specification associated with an application may be based on a particular measure, such as total ink volume.

When the ink limit is specified as a total ink volume, the ink limit might fail to factor that each ink has different volume scales across the whole range of input values. In other words, each of the inks, even at identical percentages to the maximum ink limit, could result in different total volumes. For instance, a 75% ink limit for each CMYK ink color (cyan, magenta, yellow, and black) could involve using different volumes for each ink color, such as 6.8 picoliter (pL), 7.1 pL, 6.6 pL, and 8.0 pL, respectively. Thus, if 21 pL is the total volume limit, a first CMYK combination (75%, 75%, 75%, 0) would have a total volume of 20.5 pL that is below the total volume limit (i.e., 20.5 pL is less than 21 pL) while a second CMYK combination (75%, 75%, 0, 75%) would have a total volume of 21.9 pL that exceeds the total volume limit (i.e., 21.9 pL is greater than 21 pL). Thus, an ICC printer profile that enforces a 225% total ink limit might not serve as an effective ink limit since different CMYK combinations may or may not work when considering total ink volume of the CMYK ink combinations.

Therefore, as shown, there are some situations where existing ICC profile maker software may struggle to accurately determine a conventional percentage ink limit that translates to a total ink volume, such as the total ink volume of 21 pL described in the example above. One solution that the ICC profile maker software can use in such situations involves finding and using the most conservative total ink percentage for such unorthodox inks. The resulting ink usage, however, might then be based on the worst case total volume, which can exclude many other better CMYK ink combinations from being used for the ICC printer profile. This can negatively impact the printer output color quality.

Another technique that can be used to effectively enforce unorthodox ink limits involves using a four-dimensional look up table (4D-LUT) ink limiter configured for unorthodox ink limits. For each input dimension, the percentage amount of each ink may be known, which allows each point in the 4D-LUT to represent the combination of the four ink volumes. If a particular volume is under the ink limit, the 4D-LUT can output the original color combination. When the total volume exceeds the ink limit, however, the 4D-LUT ink limiter may scale the output back to the exact ink limit by proportionally scaling back each ink limit (i.e., reduce the ink volume for ink each uniformly). Although existing ICC profile maker software typically does not support such unconventional ink limiting methods, example embodiments described herein involve methods and systems that can use the existing ICC profile maker software to make ICC printer profiles that can accommodate the unconventional ink limits.

To further illustrate, an example method presented herein may involve initially enforcing an ink limit for a test chart of CMYK combinations printed via a printer using a 4D-LUT ink limiter that is configured to enforce the ink limit. By using the 4D-LUT ink limiter (or another limiting tool), each color patch within the test chart has a CMYK ink combination that is equal to or under the ink limit. The test chart can be subsequently measured using a color measuring tool (e.g., a spectrophotometer) to obtain color measurements. These color measurements can be provided to conventional ICC profile maker software, which can then generate an initial ICC printer profile (i.e., ICC profile A) designed to use a 3D-LUT determined based on the color measurements During the generation of the ICC printer profile A, the ICC profile maker software can be instructed to not enforce any ink limit, which would result in the 3D-LUT using a color set that may include CMYK ink combinations that exceed the ink limit.

As discussed above, however, an ink limit is often used to limit negative effects from the physical interactions that arise from printing ink onto paper. Therefore, the method may further involve revising the ICC printer profile A (or creating a new ICC printer profile based on the ICC printer profile A) to produce an ICC printer profile configured to use a color set that follows the ink limit (e.g., a percentage ink limit). The revision process may involve editing one or more PCS-to-CMYK LUTs associated with the ICC printer profile by processing the output CMYK combinations using a 4D-LUT ink limiter designed to handle unorthodox ink limits. In particular, the application of the 4D-LUT ink limiter causes all of the CMYK combinations to follow the ink limit (i.e., equal to or below the ink limit), which produces a revised color set that can be used within a LUT for a new ICC profile (i.e., an ICC printer profile B). The new ICC profile can represent a version of the original ICC profile (i.e., the ICC printer profile A) that differs by using a color set designed to obey the ink limit.

Once generated, the ICC printer profile B can be stored in memory for subsequent use (e.g., local or remote memory), provided to other printers, and/or used for various print jobs. In some examples, the ICC profile maker software generates the ICC printer profile B as a new ICC profile that differs from the ICC printer profile A. In other examples, the ICC profile maker software may modify the ICC printer profile A to produce the ICC printer profile B. For instance, the color set used for the ICC printer profile A can be adjusted to adhere to the ink limit via modifying by the 4D-LUT ink limiter designed for unorthodox ink limits and then subsequently used within a 3D-LUT for the ICC printer profile B. Various other features of the example method discussed above, as well as other methods and systems, are described hereinafter with reference to the accompanying figures.

Referring now to the figures, FIG. 1 is a conceptual illustration of a system 100. In line with the discussion above, the system 100 may perform operations described herein, such as the generation of ICC printer profiles using example techniques described herein. As shown in FIG. 1, the system 100 includes a computing device 102, a printer 104 configured to print a color profile chart 106, a color measuring tool 108, and an ICC printer profile 110. In other embodiments, the system 100 may include more or fewer components.

The computing device 102 could be any type of computing device capable of executing existing ICC profile maker software, such as a mobile phone, tablet computer, wearable computer, desktop computer, laptop computer, etc. In some embodiments, the computing device 102 may operate as a part of a printing device (e.g., the printer 104). For instance, the computing device 102 may operate the operating system of the printer 104. In other embodiments, the computing device 102 and the printer 104 may be physically separate devices.

As shown in FIG. 1, the computing device 102 includes a processor 112, data storage 114, network interface 116, and input/output function 118, all of which may be coupled by a system bus 122 or a similar mechanism. It should be understood that the examples of a computing device are provided for illustrative purposes. Further, in addition to and/or alternatively to the examples above, other combinations and/or sub combinations of a printer, computer, and server may also exist, amongst other possibilities, without departing from the scope of the embodiments herein.

The processor 112 may include one or more central processing units (CPUs), such as one or more general purpose processors and/or one or more dedicated processors (e.g., application specific integrated circuits also known as ASICs or digital signal processors also known as DSPs, etc.). Other types of processors can be used.

Data storage 114, in turn, may comprise volatile and/or non-volatile data storage and can be integrated in whole or in part with processor 112. Data storage 114 may store program instructions, executable by the processor 112, and data that are manipulated by these instructions to carry out the various methods, processes, or functions described herein. Alternatively, these methods, processes, or functions can be defined by hardware, firmware, and/or any combination of hardware, firmware and software. Therefore, data storage 114 may include a tangible, non-transitory computer-readable medium, having stored thereon program instructions that, upon execution by one or more processors, cause computing device 102 to carry out any of the methods, processes, or functions disclosed in this specification or the accompanying drawings.

In the embodiment shown in FIG. 1, data storage 114 may store ICC profile software 120, which can be executed by the processor 112 to create and modify ICC profiles. The ICC profile software 120 may correspond to conventional profile software designed to create ICC profiles, such as ICC printer profile 110. In some embodiments, data storage 114 may also store one or more ICC printer profiles for use by one or more printers, such as the printer 104. The ICC printer profiles may be generated by the ICC profile software 120 and/or obtained from other computing devices through wired or wireless communication.

Network interface 116 may take the form of a wire line connection, such as an Ethernet, Token Ring, or T-carrier connection. Network interface 116 may alternatively take the form of a wireless connection, such as WiFi, BLUETOOTH®, or a wide-area wireless connection. However, other forms of physical layer connections and other types of standard or proprietary communication protocols may be used over network interface 116. Furthermore, network interface 116 may comprise multiple physical communication interfaces.

Input/output function 118 may facilitate user interaction with example computing device 102. Input/output function 118 may comprise multiple types of input devices, such as a keyboard, a mouse, a touch screen, a microphone and/or any other device that is capable of receiving input from a user. Similarly, input/output function 118 may comprise multiple types of output devices, such as a display, printer, one or more light emitting diodes (LEDs), speaker, or any other device that is capable of providing output discernible to a user. Additionally or alternatively, example computing device 102 may support remote access from another device, via network interface 116 or via another interface (not shown), such as an RS-132 or Universal Serial Bus (USB) port.

The system 100 may enable the generation of new ICC printer profiles, such as the ICC printer profile 110. To illustrate an example ICC printer profile generation process, the system 100 may initiate the generation of the new ICC printer profile by causing the printer 104 to print a color profile chart 106 based on a source color space, such as a cyan-magenta-yellow-black profile chart. The printer 104 may print the color profile chart 106 using a 4D-LUT ink limiter that limits the ink total of the different CMYK ink combinations making up the various color segments of the color profile chart 106. In particular, each CMYK ink combination would be equal to or below the ink limit enforced by the 4D-LUT ink limiter.

The color profile chart 106 can be measured by a color measuring tool 108, such as a spectrophotometer. The color measuring tool 108 may obtain color measurements of the different color segments of the color profile chart 106, which can be used by the ICC profile software 120 to generate an initial ICC printer profile based on the measurements.

When generating the initial ICC printer profile, the ICC profile software 120 may be instructed to not enforce an ink limit. As a result, one or more CMYK ink combinations within a LUT associated with the initial ICC printer profile may exceed the conventional ink limit. To enforce an ink limit, a 4D-LUT ink limiter configured for unorthodox ink limits may be used to cause all CMYK ink combinations to adhere to an ink limit. The ICC profile software 120 may use the new set of CMYK ink combinations that follow the ink limit to generate the ICC printer profile 110. This way, the ICC printer profile 110 would have a color set represented by CMYK ink combinations at or below the ink limit enforced by the 4D-LUT ink limiter. The computing device 102 may then provide the ICC printer profile 110 to one or more printers (e.g., the printer 104) and store the ICC printer profile 110 at data storage unit 114.

Figure 2:
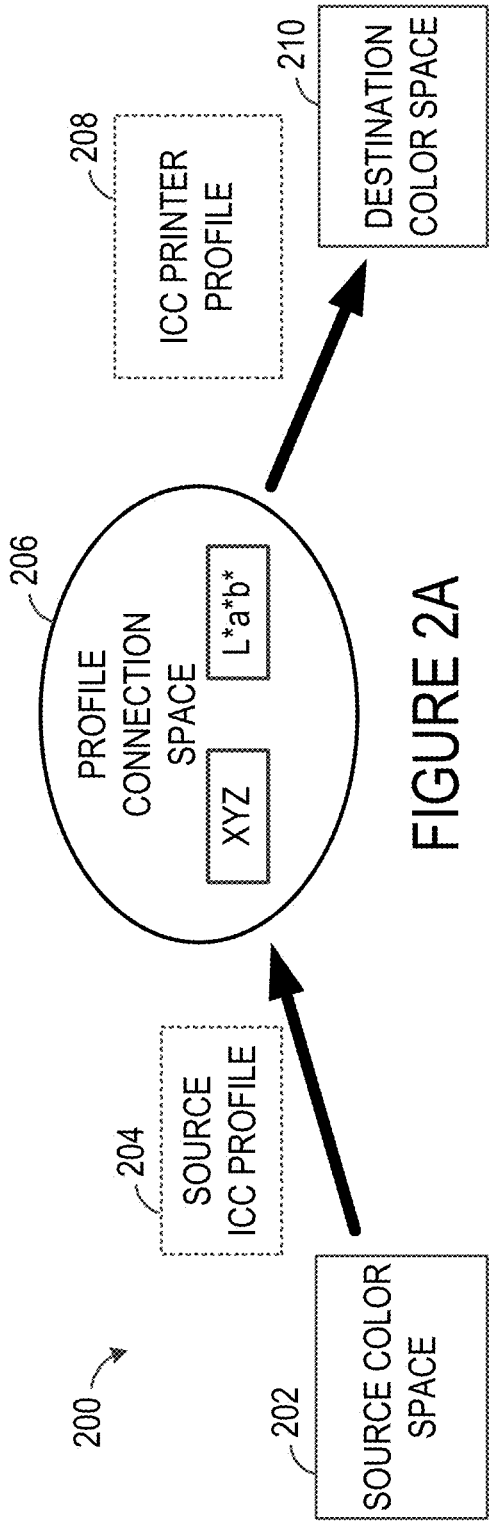
FIG. 2A illustrates a color conversion system, according to an example embodiment.
FIG. 2B illustrates an ICC printer profile, according to an example embodiment.

FIG. 2A illustrates a color conversion system, according to an example embodiment. The system 200 represents a managed color workflow that offers color consistency and predictability during color conversion. As shown in FIG. 2A, the system 200 includes a source color space 202, a source ICC profile 204, a profile connection space (PCS) 206, an ICC printer profile 208, and a destination color space 210.

The system 200 may be used for color conversion from a source color space 202 (e.g., colors associated with a print job) to destination color space 210 (e.g., CMYK ink combinations that a printer can print). As such, the system 200 may involve initially obtaining the source color space 202, which may represent colors used by a source device (e.g., a computer monitor, a scanner). Some examples of the source color space can include an RGB color space, a CMYK color space, and a CMYKOGV color space.

The system 200 further involves identifying a source ICC profile 204 that corresponds to the source color space 202. The source ICC profile 204 may provide a mapping for colors within the source color space 202 to the PCS 206. For example, the source ICC profile 204 may store one or more LUTs that can be used to map source color space 202 to the L*a*b* color space or to the XYZ color space for the PCS 206. Alternatively, the source ICC profile 204 can include one or more equations for mapping the source color space 202 to the L*a*b* color space or to the XYZ color space for the PCS 206.

The PCS 206 can serve as the interface which provides an unambiguous connection between input profiles (e.g., the source ICC profile 204) and output profiles (e.g., the ICC printer profile 208) within the system 200. The PCS 206 can allow the profile transforms for input, display, and output devices to be decoupled so that they can be produced independently. As such, the PCS 206 can serve as the virtual destination for input transforms and the virtual source for output transforms. When the input and output transforms are based on the same PCS definition, even though they are created independently, the input and output transforms can be paired arbitrarily at run time by a color-management module (CMM) and will yield consistent and predictable results when applied to color values.

The ICC printer profile 208 may enable mapping colors from the PCS 206 to the destination color space 210. In particular, the ICC printer profile 208 may provide a mapping for colors within the PCS 206 to the destination color space 210. For example, the ICC printer profile 208 may store one or more LUTs that can be used to map input colors from the PCS 206 (e.g., L*a*b* color space) to the CMYK color space associated with the destination color space 210. Alternatively, the ICC printer profile 208 can include one or more equations for mapping colors from the PCS 206 to the destination color space 210. In some instances, the selection of the ICC printer profile 208 may depend on the type of printer performing the print job using the destination color space 210.

FIG. 2B illustrates inputs and outputs for the ICC printer profile 208, according to one or more example embodiments. As shown, the ICC printer profile 208 may represent a destination IC profile configured to enable a device to map input L*a*b* values 212 obtained from the PCS 206 shown in FIG. 2A to output CMYK values 214 used to complete the print job. For instance, the ICC printer profile 208 can store one or more LUTs, such as a LUT for mapping colors from the L*a*b* color space to the destination color space 210.

Figure 3:
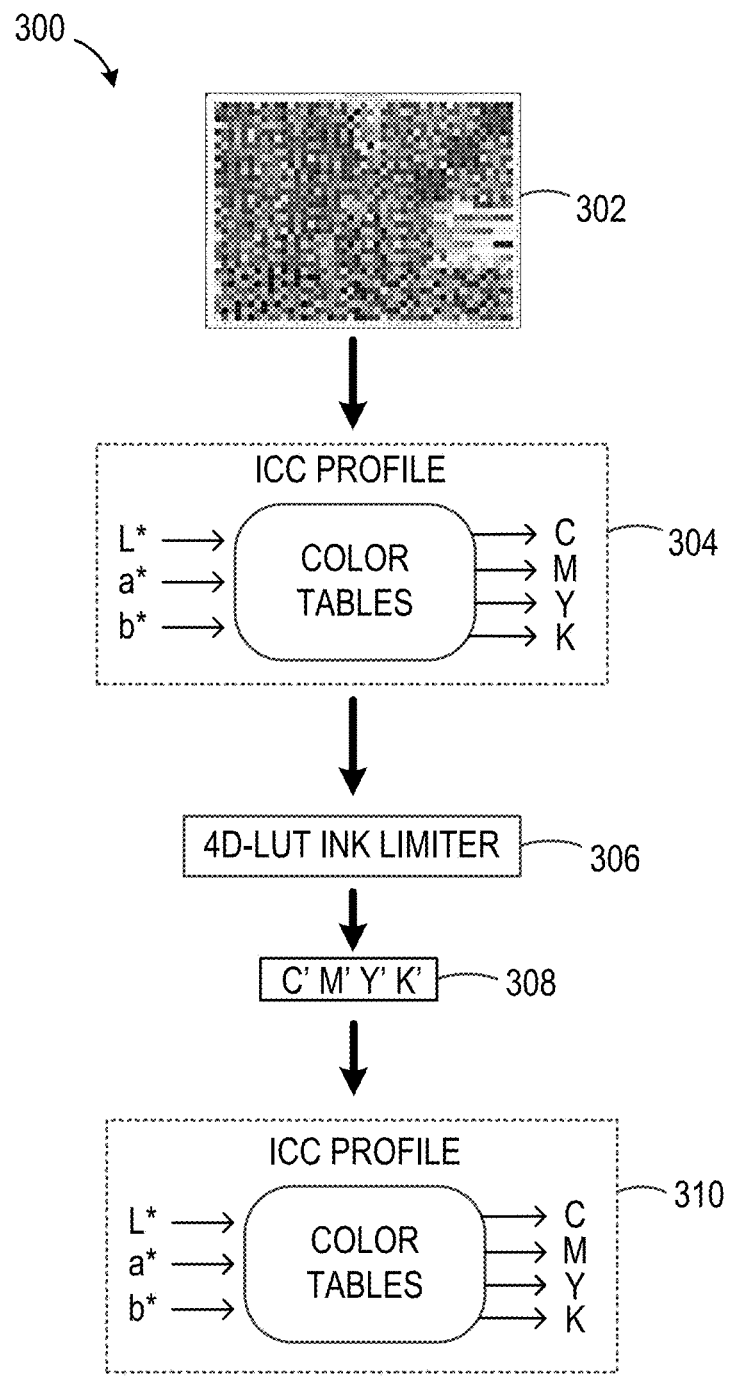
FIG. 3 illustrates a process for creating ICC printer profiles with unorthodox ink limits, according to an example embodiment.

FIG. 3 illustrates a process for creating ICC printer profiles with unorthodox ink limits, according to an example embodiment. The process 300 can be performed using a color instrument, a printer (e.g., the printer 104), and/or a computing device (e.g., the computing device 102) executing existing ICC profile maker software, such as the system 100 shown in FIG. 1.

As shown in FIG. 3, the process 300 may initially involve printing (or otherwise obtaining) a color profile chart 302 that depicts a variety color segments each having a total ink combination limited by an ink limiting 4D-LUT or another type of ink limiter. Particularly, the color profile chart 302 may be represented by color combinations that are equal to or below the ink limit imposed by the 4D-LUT. For example, the printing device may print a CMYK color profile chart that includes color segments represented by various combinations of cyan ink, magenta ink, yellow ink, and black ink. In some instances, the color profile chart may have a checkerboard pattern with each segment made up of a different color combination.

By way of an example, an ink limiting 4D-LUT may be entered into the raster image processor software of the printer configured to printer the color profile chart 302. By using the ink limiting 4D-LUT, color combinations with ink amounts over an ink limit (e.g., a conventional ink limit associated with the ICC profile maker software) are forced back to the ink limit such that all ink combinations represented in the color profile chart 302 are below the ink limit.

After printing the color profile chart, 302 the different color patches within the color profile chart 302 are measured via a color instrument, such as a spectrophotometer or another type of color measuring tool. As shown in the process 300, these color measurements from the color instrument can be used by ICC profile maker software operating on a computing device to generate the ICC profile 304. When generating the ICC profile 304, the ICC profile maker software can be instructed to not impose any ink limits on the different ink combinations used to replicate the color measurements. As a result, one or more LUTs associated with the ICC profile 304 may include some CMYK ink combinations that exceed the ink limit.

Because ink combinations that exceed the ink limit can have a negative impact on print jobs due to chemical interactions that arise between ink and paper, the process 300 further involves using a 4D-LUT ink limiter 306 to modify the LUTs of the ICC profile 304. In particular, the 4D-LUT ink limiter 306 is designed to handle unorthodox ink limits and can be used to force any of the CMYK ink combination that exceed an ink limit under the ink limit. The use of the 4D-LUT ink limiter 306 produces the output C'M'Y'K' 308, which only includes CMYK ink combinations that are equal to or below the ink limit enforced by the 4D-LUT ink limiter 306. As a result, the output C'M'Y'K' 308 can be used by the ICC profile maker software to generate a new ICC profile 310, which corresponds to the original ICC profile 304, but only uses CMYK ink combinations that adhere to the ink limit enforced by the 4D-LUT ink limiter 306. The ICC profile 310 can then be subsequently used by one or more printers, stored in memory, and transmitted to other devices.

Figure 4:
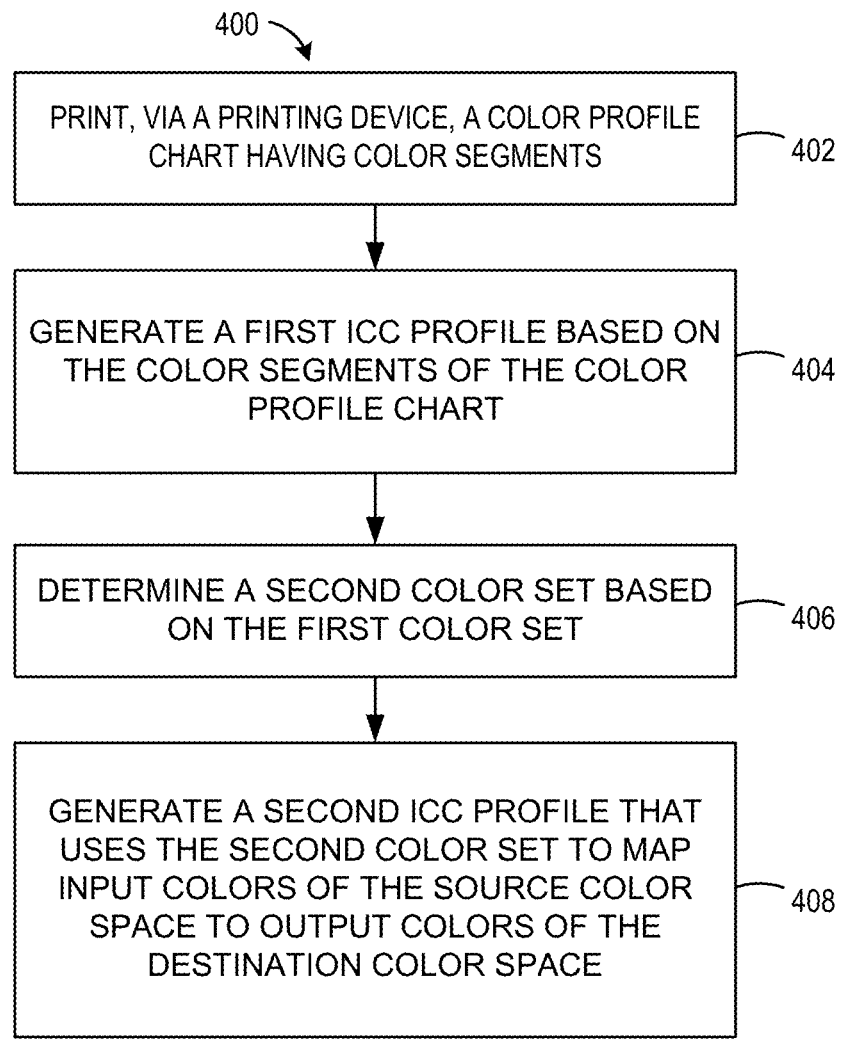
FIG. 4 shows a flowchart for a method, according to an example embodiment.

FIG. 4 shows a flowchart of an example method 400, according to an example embodiment. Method 400 shown in FIG. 4 presents an embodiment of a method that, for example, could be used with the system shown in FIG. 1, for example, or any of the systems disclosed herein. For example, method 400 could be carried out by computing system 102 shown in FIG. 1 and/or could be carried out by other types of devices or device subsystems.

Method 400 may include one or more operations, functions, or actions as illustrated by one or more of blocks 402-408. Although these blocks are illustrated in a sequential order, these blocks may also be performed in parallel, and/or in a different other than those described herein. Also, the various blocks may be combined into fewer blocks, divided into additional blocks, and/or removed based upon the desired implementation.

Initially, at block 402, the method 400 involves printing, via a printing device, a color profile chart having a plurality of color segments. Each color segment is represented by a color combination that is equal to or below an ink limit.

In some examples, printing the color profile chart having the plurality of color segments involves printing a CMYK color profile chart with a 4D-LUT ink limiter configured for unorthodox ink limits. In particular, printing the CMYK color profile chart with the 4D-LUT ink limiter can cause each color combination representative of a particular color segment to be equal to or below the ink limit. The ink limit can correspond to an ink limit that depends on a type of paper used to print the color profile chart.

At block 404, the method 400 involves generating a first ICC profile based on the plurality of color segments of the color profile chart. A computing device may use ICC profile software to generate the first ICC profile. For instance, the computing device 102 may use the ICC profile software 120 to generate the first ICC profile.

The first ICC profile can use a first color set to map input colors of a source color space to output colors of a destination color space. In some instances, at least one color of the first color set is represented by a particular color combination that exceeds the ink limit. The first ICC profile may include a first lookup table that maps the input colors of the source color space to the output colors of the destination color space. As such, the first lookup table can include the first color set.

In some examples, generating the first ICC profile involves obtaining measurements of the plurality of color segments of the color profile chart and generating the first ICC profile based on the measurements of the plurality of color segments. In some instances, the first ICC profile may be generated such that respective color combinations used to represent the first color set are determined without an ink limit. As a result, the first color set may include one or more color combinations that exceed the ink limit.

At block 406, the method 400 involves determining a second color set based on the first color set. Each color of the second color set can be represented by a given color combination that is equal to or below the ink limit. The second color set may be determined using an ink limiter, such as a 4D-LUT ink limiter configured to handle unorthodox ink limits.

In some examples, determining the second color set based on the first color set involves modifying respective color combinations representing the first color set using a 4D-LUT ink limiter configured for unorthodox ink limits. The 4D-LUT ink limiter causes each color combination for the second color set to be equal to or below the ink limit. A second color set may be determined based on the modified respective color combinations.

In some examples, modifying respective color combinations representing the first color set using the 4D-LUT ink limiter configured for unorthodox ink limits may involve enforcing a total volume ink limit using the 4D-LUT ink limiter. As such, the 4D-LUT ink limiter may be configured to uniformly scale-down each color combination that exceeds the total volume ink limit such that all color combinations are equal to or below the total volume ink limit.

At block 408, the method 400 involves generating a second ICC profile that uses the second color set to map input colors of the source color space to output colors of the destination color space. The second ICC profile can involve a second lookup table (LUT) that maps the input colors of the source color space to the output colors of the destination color space. As such, the second lookup table can include the second color set.

In some embodiments, the method 400 may further involve providing the second ICC profile to other printing devices (e.g., a second printing device). In addition, the method 400 can also involve storing the second ICC profile in a memory.

Figure 5:
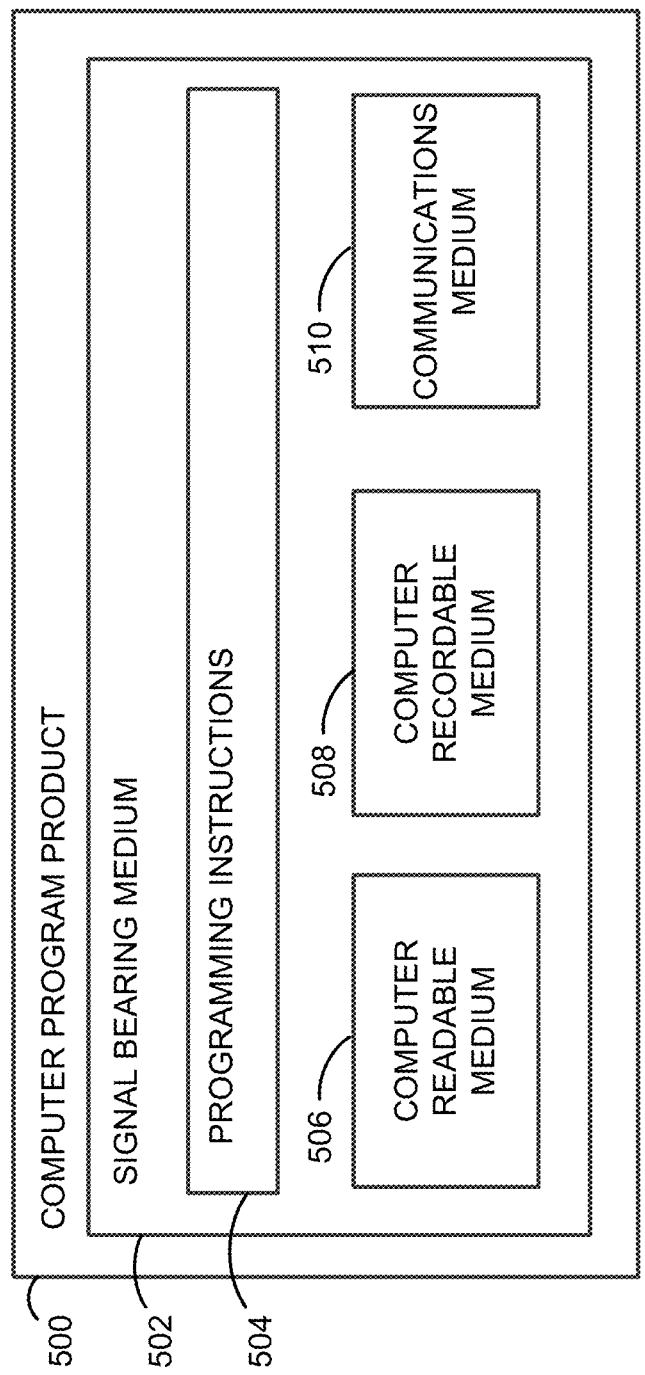
FIG. 5 illustrates a schematic diagram of a computer program, according to example embodiments.

FIG. 5 is a schematic illustrating a conceptual partial view of an example computer program product that includes a computer program for executing a computer process on a computing device, arranged according to at least some embodiments presented herein. In some embodiments, the disclosed methods may be implemented as computer program instructions encoded on a non-transitory computer-readable storage media in a machine-readable format, or on other non-transitory media or articles of manufacture.

In one embodiment, example computer program product 500 is provided using signal bearing medium 502, which may include one or more programming instructions 504 that, when executed by one or more processors may provide functionality or portions of the functionality described above with respect to FIGS. 1-4. In some examples, the signal bearing medium 502 may encompass a non-transitory computer-readable medium 506, such as, but not limited to, a hard disk drive, a Compact Disc (CD), a Digital Video Disk (DVD), a digital tape, memory, etc. In some implementations, the signal bearing medium 502 may encompass a computer recordable medium 508, such as, but not limited to, memory, read/write (R/W) CDs, R/W DVDs, etc. In some implementations, the signal bearing medium 502 may encompass a communications medium 510, such as, but not limited to, a digital and/or an analog communication medium (e.g., a fiber optic cable, a waveguide, a wired communications link, a wireless communication link, etc.). Thus, for example, the signal bearing medium 502 may be conveyed by a wireless form of the communications medium 510.

The one or more programming instructions 504 may be, for example, computer executable and/or logic implemented instructions. In some examples, a computing device such as the computer device 100 of FIG. 1 may be configured to provide various operations, functions, or actions in response to the programming instructions 504 conveyed to the computer device 100 by one or more of the computer readable medium 506, the computer recordable medium 508, and/or the communications medium 510.

The non-transitory computer readable medium could also be distributed among multiple data storage elements, which could be remotely located from each other. Alternatively, the computing device that executes some or all of the stored instructions could be another computing device, such as a server.

The above detailed description describes various features and functions of the disclosed systems, devices, and methods with reference to the accompanying figures. While various aspects and embodiments have been disclosed herein, other aspects and embodiments will be apparent. The various aspects and embodiments disclosed herein are for purposes of illustration and are not intended to be limiting, with the true scope being indicated by the following claims.

It should be understood that arrangements described herein are for purposes of example only. As such, those skilled in the art will appreciate that other arrangements and other elements (e.g. machines, apparatuses, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location.

What is claimed is:

1. A system comprising:
a processor; and
a non-transitory computer-readable medium having stored therein instructions that are executable to cause the system to perform functions comprising:
printing, via a printing device, a color profile chart having a plurality of color segments, wherein each color segment is represented by a color combination that is equal to or below an ink limit;
based on the plurality of color segments of the color profile chart, generating a first ICC profile, wherein the first ICC profile uses a first color set to map input colors of a source color space to output colors of a destination color space, and wherein at least one color of the first color set is represented by a particular color combination that exceeds the ink limit;
determining a second color set based on the first color set, wherein each color of the second color set is represented by a given color combination that is equal to or below the ink limit, wherein determining the second color set based on the first color set comprises modifying respective color combinations representing the first color set using a four-dimensional look up table (4D-LUT) ink limiter configured for unorthodox ink limits, wherein the 4D-LUT ink limiter causes each color combination to be equal to or below the ink limit, and determining the second color set based on the modified respective color combinations; and
generating a second ICC profile that uses the second color set to map input colors of the source color space to output colors of the destination color space.

2. The system of claim 1, wherein printing the color profile chart having the plurality of color segments comprises:
printing a Cyan-Magenta-Yellow-Black (CMYK) color profile chart with a four-dimensional look up table (4D-LUT) ink limiter configured for unorthodox ink limits, wherein printing the CMYK color profile chart with the 4D-LUT ink limiter causes each color combination representative of a particular color segment to be equal to or below the ink limit.

3. The system of claim 2, wherein the ink limit depends on a type of paper used to print the color profile chart.

4. The system of claim 1, wherein generating the first ICC profile comprises:
obtaining measurements of the plurality of color segments of the color profile chart; and
generating the first ICC profile based on the measurements of the plurality of color segments.

5. The system of claim 4, wherein generating the first ICC profile based on the measurements of the plurality of color segments comprises:
generating the first ICC profile such that respective color combinations used to represent the first color set are determined without the ink limit.

6. The system of claim 1, wherein the first ICC profile comprises:
a first lookup table that maps the input colors of the source color space to the output colors of the destination color space, wherein the first lookup table comprises the first color set.

7. The system of claim 6, wherein the second ICC profile comprises:
a second lookup table that maps the input colors of the source color space to the output colors of the destination color space, wherein the second lookup table comprises the second color set.

8. A method comprising:
printing, via a printing device, a color profile chart having a plurality of color segments, wherein each color segment is represented by a color combination that is equal to or below an ink limit;
based on the plurality of color segments of the color profile chart, generating a first ICC profile, wherein the first ICC profile uses a first color set to map input colors of a source color space to output colors of a destination color space, and wherein at least one color of the first color set is represented by a particular color combination that exceeds the ink limit;
determining a second color set based on the first color set, wherein each color of the second color set is represented by a given color combination that is equal to or below the ink limit, wherein determining the second color set based on the first color set comprises modifying respective color combinations representing the first color set using a four-dimensional look up table (4D-LUT) ink limiter configured for unorthodox ink limits, wherein the 4D-LUT ink limiter causes each color combination to be equal to or below the ink limit, and determining the second color set based on the modified respective color combinations; and generating a second ICC profile that uses the second color set to map the input colors of the source color space to the output colors of the destination color space.

9. The method of claim 8, wherein printing the color profile chart having the plurality of color segments comprises:

printing a Cyan-Magenta-Yellow-Black (CMYK) color profile chart with a four-dimensional look up table (4D-LUT) ink limiter configured for unorthodox ink limits, wherein printing the CMYK color profile chart with the 4D-LUT ink limiter causes each color combination representative of a particular color segment to be equal to or below the ink limit.

10. The method of claim 9, wherein the ink limit corresponds to a particular ink limit that depends on a type of paper used to print the color profile chart.

11. The method of claim 8, wherein generating the first ICC profile comprises:

obtaining measurements of the plurality of color segments of the color profile chart; and generating the first ICC profile based on the measurements of the plurality of color segments.

12. The method of claim 11, wherein generating the first ICC profile based on the measurements of the plurality of color segments comprises:

generating the first ICC profile such that respective color combinations used to represent the first color set are determined without the ink limit.

13. The method of claim 8, wherein the first ICC profile comprises:

a first lookup table that maps the input colors of the source color space to the output colors of the destination color space, wherein the first lookup table comprises the first color set.

14. The method of claim 13, wherein the second ICC profile comprises:

a second lookup table that maps the input colors of the source color space to the output colors of the destination color space, wherein the second lookup table comprises the second color set.

15. The method of claim 8, wherein modifying respective color combinations representing the first color set using the 4D-LUT ink limiter configured for unorthodox ink limits comprises:

enforcing a total volume ink limit using the 4D-LUT ink limiter, wherein the 4D-LUT ink limiter is configured to uniformly scale-down each color combination that exceeds the total volume ink limit such that all color combinations are equal to or below the total volume ink limit.

16. A non-transitory computer-readable medium having stored therein instructions that are executable to cause a system to perform functions comprising:

printing, via a printing device, a color profile chart having a plurality of color segments, wherein each color segment is represented by a color combination that is equal to or below a ink limit;

based on the plurality of color segments of the color profile chart, generating a first ICC profile, wherein the first ICC profile uses a first color set to map input colors of a source color space to output colors of a destination color space, and wherein at least one color of the first color set is represented by a particular color combination that exceeds the ink limit;

determining a second color set based on the first color set, wherein each color of the second color set is represented by a given color combination that is equal to or below the ink limit, wherein determining the second color set based on the first color set comprises modifying respective color combinations representing the first color set using a four-dimensional look up table (4D-LUT) ink limiter configured for unorthodox ink limits, wherein the 4D-LUT ink limiter causes each color combination to be equal to or below the ink limit, and determining the second color set based on the modified respective color combinations; and generating a second ICC profile that uses the second color set to map input colors of the source color space to output colors of the destination color space.

17. The non-transitory computer-readable medium of claim 16, wherein printing the color profile chart having the plurality of color segments comprises:

printing a Cyan-Magenta-Yellow-Black (CMYK) color profile chart with a four-dimensional look up table (4D-LUT) ink limiter configured for unorthodox ink limits, wherein printing the CMYK color profile chart with the 4D-LUT ink limiter causes each color combination representative of a particular color segment to be equal to or below the ink limit.

18. The non-transitory computer-readable medium of claim 16, further comprising:

storing the second ICC profile in a memory.

* * * * *